US012670885B2

(12) United States Patent
Oh et al.

(10) Patent No.: US 12,670,885 B2
(45) Date of Patent: Jun. 30, 2026

(54) DISPLAY DEVICE AND IMAGE DISPLAY METHOD THEREOF

(71) Applicant: SAMSUNG ELECTRONICS CO., LTD., Suwon-si (KR)

(72) Inventors: Sanghoon Oh, Suwon-si (KR); Youngkook Kim, Suwon-si (KR); Jung Hur, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 5 days.

(21) Appl. No.: 18/979,880

(22) Filed: Dec. 13, 2024

(65) Prior Publication Data

US 2025/0140178 A1     May 1, 2025

Related U.S. Application Data

(63) Continuation of application No. PCT/KR2024/016173, filed on Oct. 23, 2024.

(30) Foreign Application Priority Data

Oct. 30, 2023     (KR) ........................ 10-2023-0147149

(51) Int. Cl.
*G09G 5/10* (2006.01)
*G06F 3/01* (2006.01)
(52) U.S. Cl.
CPC .............. *G09G 5/10* (2013.01); *G06F 3/013* (2013.01); *G09G 2320/0626* (2013.01); *G09G 2354/00* (2013.01); *G09G 2360/16* (2013.01)

(58) Field of Classification Search
CPC ............. G09G 5/10; G09G 2320/0626; G09G 2354/00; G09G 2360/16
See application file for complete search history.

(56) References Cited

U.S. PATENT DOCUMENTS 9,520,075 B2 * 12/2016 Cho ......................... G09G 5/06
9,953,615 B2   4/2018 Kwon et al.
10,062,331 B2   8/2018 Kim et al.
(Continued)

FOREIGN PATENT DOCUMENTS

CN       111599295 B  * 6/2023 .............. G09G 5/10
JP       2017-79001 A     4/2017
(Continued)

OTHER PUBLICATIONS

Communication dated Feb. 19, 2025, issued by the International Searching Authority in International Application No. PCT/KR2024/016173 (PCT/ISA/210 and PCT/ISA/237).
(Continued)

*Primary Examiner* — Patrick F Marinelli

(74) *Attorney, Agent, or Firm* — Sughrue Mion, PLLC

(57)     ABSTRACT

Provided is a display device including a sensor, a display, and at least one processor configured to display a high dynamic range (HDR) image having a first brightness range on the display, and display an HDR image having a second
(Continued)

brightness range on the display based on a user being identified by the sensor as being within a predetermined distance from the display while the HDR image having the first brightness range is displayed, wherein a maximum value of the second brightness range is less than a maximum value of the first brightness range.

18 Claims, 21 Drawing Sheets

(56) References Cited

U.S. PATENT DOCUMENTS

| | | | | |
|---|---|---|---|---|
| 10,310,582 | B2 * | 6/2019 | Park | H04B 5/79 |
| 10,447,961 | B2 | 10/2019 | Pines et al. | |
| 11,295,703 | B2 * | 4/2022 | Li | G09G 5/10 |
| 11,501,738 | B1 * | 11/2022 | Chen | G09G 5/10 |
| 2013/0082991 | A1 * | 4/2013 | Lin | G09G 5/00 |
| | | | | 345/207 |
| 2017/0169794 | A1 | 6/2017 | Nagano et al. | |
| 2017/0229099 | A1 | 8/2017 | Mito | |
| 2018/0338104 | A1 * | 11/2018 | Pines | H04N 21/44 |
| 2019/0385506 | A1 | 12/2019 | Andrivon et al. | |

| | | | | |
|---|---|---|---|---|
| 2021/0020140 | A1 * | 1/2021 | Li | G09G 5/10 |
| 2024/0212649 | A1 | 6/2024 | Hur et al. | |
| 2025/0140178 | A1 * | 5/2025 | Oh | G06F 3/013 |

FOREIGN PATENT DOCUMENTS

| | | |
|---|---|---|
| JP | 2018 536898 A | 12/2018 |
| JP | 2020-187514 A | 11/2020 |
| KR | 10 2014 0116607 A | 10/2014 |
| KR | 10 2017 0031941 A | 3/2017 |
| KR | 10 2017 0082029 A | 7/2017 |
| KR | 10 2076506 B1 | 2/2020 |
| KR | 10-2020-0086156 A | 7/2020 |
| KR | 10-2231046 B1 | 3/2021 |
| KR | 10-2362042 B1 | 2/2022 |
| KR | 10-2366230 B1 | 2/2022 |
| KR | 10 2022 0101445 A | 7/2022 |
| KR | 10-2023-0035784 A | 3/2023 |
| KR | 10 2025 0034725 A | 3/2025 |

OTHER PUBLICATIONS

Extended European Search Report issued Apr. 24, 2026 by the European Patent Office for EP Patent Application No. 24886121.3.

* cited by examiner

Figure 2B:
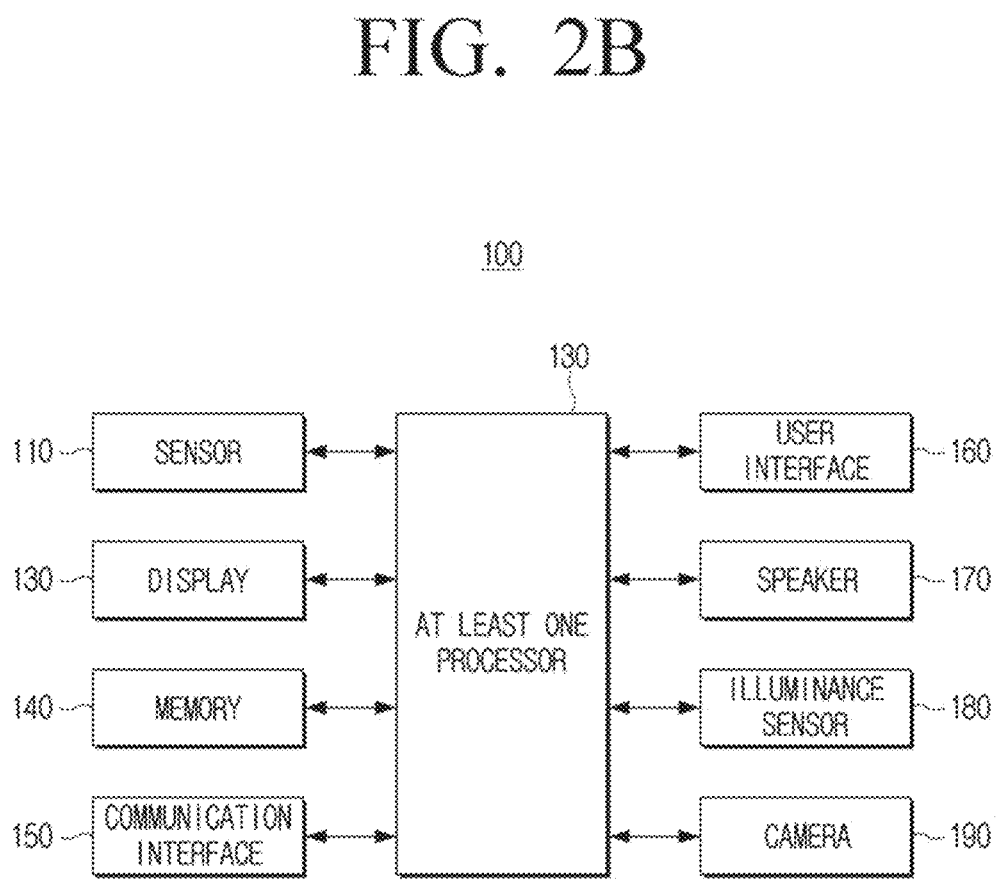

| 110 — | SENSOR | ⟷ | | ⟷ | USER INTERFACE | — 160 |

| 130 — | DISPLAY | ⟷ | AT LEAST ONE PROCESSOR | ⟷ | SPEAKER | — 170 |

| 140 — | MEMORY | ⟷ | | ⟷ | ILLUMINANCE SENSOR | — 180 |

| 150 — | COMMUNICATION INTERFACE | ⟷ | | ⟷ | CAMERA | — 190 |

DISPLAY DEVICE AND IMAGE DISPLAY METHOD THEREOF

CROSS-REFERENCE TO RELATED APPLICATIONS

This application is a bypass continuation of International Application No. PCT/KR2024/016173, filed on Oct. 23, 2024, which is based on and claims priority to Korean Patent Application No. 10-2023-0147149, filed on Oct. 30, 2023, in the Korean Intellectual Property Office, the disclosures of which are incorporated by reference herein in their entireties.

BACKGROUND

1. Field

Embodiments of the present disclosure relate to a display device that displays an image and an image display method thereof.

2. Description of Related Art

A display device, such as a digital signage (or a signage device), may be installed in indoor or outdoor locations to provide various contents, advertisements, etc.

Recently, more digital signages have increasingly provided high-brightness images as the demand for the high-brightness images has grown significantly.

However, a user may experience unexpected discomfort due to strong light emitted from the digital signage displaying the high-brightness image.

SUMMARY

One or more embodiments provide display device that displays an image and an image display method thereof.

According to an aspect of one or more embodiments, there is provided a display device including a sensor, a display, and at least one processor configured to display a high dynamic range (HDR) image having a first brightness range on the display, and display an HDR image having a second brightness range on the display based on a user being identified by the sensor as being within a predetermined distance from the display while the HDR image having the first brightness range is displayed, wherein a maximum value of the second brightness range is less than a maximum value of the first brightness range.

The maximum value of the first brightness range may be peak brightness of the display, and the maximum value of the second brightness range may be maximum brightness of the display.

The at least one processor may be further configured to identify the user being within the predetermined distance from the display based on the user being detected by the sensor as being within the predetermined distance from the display.

The at least one processor may be further configured to identify the user as being within the predetermined distance from the display based on the user being detected by the sensor as being in front of the display and within the predetermined distance from the display device, and identify the user as not being within the predetermined distance from the display based on the user being detected by the sensor as being behind the display device and within the predetermined distance from the display device.

The at least one processor may be further configured to display the HDR image having the first brightness range on the display based on the user being identified by the sensor as not being within the predetermined distance from the display while the HDR image having the second brightness range is displayed.

The at least one processor may be further configured to display the HDR image having the second brightness range on the display for a predetermined time from a time point at which the user is identified as not being within the predetermined distance from the display, and display the HDR image having the first brightness range on the display based on the predetermined time elapsing.

The at least one processor may be further configured to maintain the HDR image having the second brightness range being displayed on the display based on the user being identified by the sensor as being within the predetermined distance from the display within the predetermined time.

The at least one processor may be further configured to display the HDR image having the second brightness range on the display based on at least one user among the plurality of users in a vicinity of the display being identified by the sensor as being within the predetermined distance from the display while the HDR image having the first brightness range is displayed.

The at least one processor may be further configured to identify a feature of the user within the predetermined distance from the display, display the HDR image having the second brightness range on the display based on the feature of the user being a first feature, and display an HDR image having a third brightness range on the display based on the feature of the user being a second feature, wherein the feature of the user is determined based on an age of the user, and wherein a maximum value of the third brightness range is less than the maximum value of the second brightness range.

The at least one processor may be further configured to identify a user gaze direction by the sensor, and display a partial image of the HDR image that is displayed in a region corresponding to the gaze direction on the display in the second brightness range.

According to another aspect of one or more embodiments, there is provided an image display method of a display device including a sensor, the method including displaying a high dynamic range (HDR) image having a first brightness range on a display, and displaying an HDR image having a second brightness range on the display based on a user being identified by the sensor as being within a predetermined distance from the display while the HDR image having the first brightness range is displayed, wherein a maximum value of the second brightness range is less than a maximum value of the first brightness range.

The maximum value of the first brightness range may be peak brightness of the display, and the maximum value of the second brightness range may be maximum brightness of the display.

The method may further include identifying the user as being within the predetermined distance from the display based on the user being detected by the sensor as being within a predetermined distance from the display.

The method may further include identifying the user as being within the predetermined distance from the display based on the user being detected by the sensor as being in front of the display and within the predetermined distance from the display device, and identifying the user as not being within the predetermined distance from the display based on the user being detected by the sensor as being behind the display device and within the predetermined distance from the display device.

The method may further include displaying the HDR image having the first brightness range on the display based on the user being identified by the sensor as not being within the predetermined distance from the display while the HDR image having the second brightness range is displayed.

The method may further include displaying the HDR image having the second brightness range on the display for a predetermined time from a time point at which the user is identified as not being within the predetermined distance from the display, and displaying the HDR image having the first brightness range on the display based on the predetermined time elapsing.

The method may further include maintaining the HDR image having the second brightness range being displayed on the display based on the user being identified by the sensor as being within the predetermined distance from the display within the predetermined time.

The method may further include displaying the HDR image having the second brightness range on the display based on at least one user among the plurality of users in a vicinity of the display being identified by the sensor as being within the predetermined distance from the display while the HDR image having the first brightness range is displayed.

The method may further include identifying a feature of the user within the predetermined distance from the display, displaying the HDR image having the second brightness range on the display based on the feature of the user being a first feature, and displaying an HDR image having a third brightness range on the display based on the feature of the user being a second feature, wherein the feature of the user is determined based on an age of the user, and wherein a maximum value of the third brightness range is less than the maximum value of the second brightness range.

The method may further include identifying a user gaze direction by the sensor, and displaying a partial image of the HDR image that is displayed in a region corresponding to the gaze direction on the display in the second brightness range.

BRIEF DESCRIPTION OF DRAWINGS

Embodiments will be more clearly understood from the following detailed description taken in conjunction with the accompanying drawings in which:

FIG. 2B is a block diagram for explaining a configuration of the display device according to one or more embodiments;

DETAILED DESCRIPTION

Figure 1:
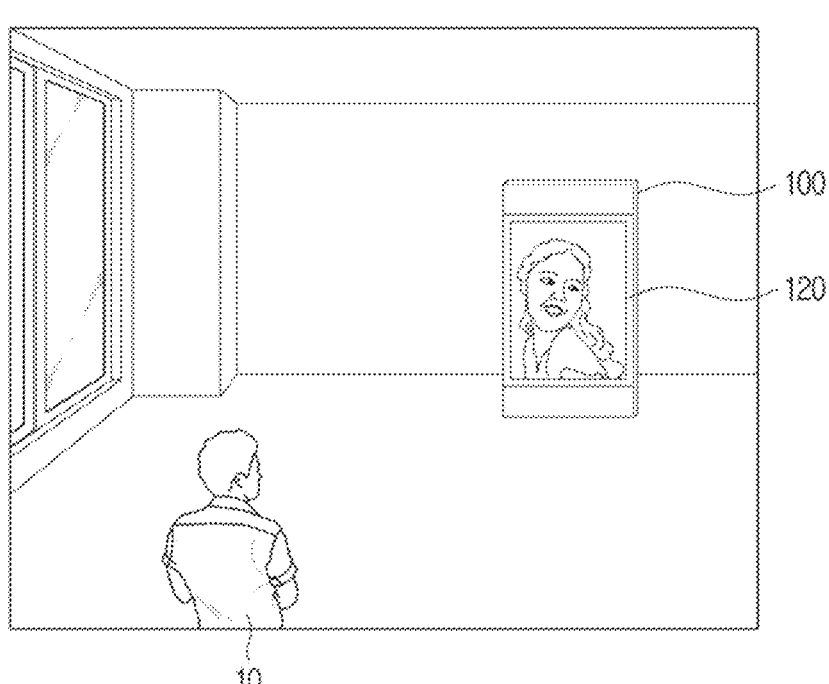
FIG. 1 is a diagram showing an example of a display device according to one or more embodiments.

It is to be understood that various embodiments of the present disclosure and terms used herein are not intended to limit technical features described in the present disclosure to specific embodiments, and include various modifications, equivalents, and substitutions of the corresponding embodiments.

Throughout the accompanying drawings, similar components are denoted by similar reference numerals.

A singular noun corresponding to an item is intended to include one or more of the items, unless a relevant context clearly indicates otherwise.

In the present disclosure, an expression "A or B", "at least one of A and B", "at least one of A or B", "A, B, or C", "at least one of A, B, and C", "at least one of A, B, or C", or the like, may include any one of the items enumerated together or all possible combinations thereof. For example, "A or B", "at least one of A and B", or "at least one of A or B" may indicate all of 1) a case where at least one A is included, 2) a case where at least one B is included, or 3) a case where both of at least one A and at least one B are included.

A term such as "first" or "second" may be used simply to distinguish one element from another element, and does not limit the corresponding component in any other respect (e.g., importance or order).

In case that a component (for example, a first component) is mentioned to be "coupled to" or "connected to" another component (for example, a second component) with or without terms "operably or communicatively", it is to be understood that the component may be coupled to another component directly (e.g., in a wired manner), in a wireless manner, or through a third component).

It should be further understood that terms "include", "have", or the like, used in this document specify the presence of features, numerals, steps, operations, components, parts, or combinations thereof, mentioned in the specification, and do not preclude the presence or addition of one or more other features, numerals, steps, operations, components, parts, or combinations thereof.

If a component is referred to as being "connected", "coupled", "supported", or "in contact" with another component, it includes not only a case where the components are directly connected, coupled, supported, or in contact with each other, but also a case where the components are indirectly connected, coupled, supported, or in contact with each other through a third component.

In case that a component is referred to be disposed "on" another component, it includes not only a case where the component is in contact with another component, but also a case where still another component exists between the two components.

A term "and/or" includes a combination of a plurality of related components or any one of the plurality of related components.

An expression "a device configured to" in some contexts may indicate that the device may "perform~" together with another device or component. For example, "a processor configured (or set) to perform A, B, and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented in hardware or software, or be implemented by a combination of hardware and software. In addition, a plurality of "modules" or a plurality of "~ers/~ors" may be integrated in at least one module and implemented by at least one processor (not shown) except for a "module" or a "~er/or" that needs to be implemented by specific hardware.

Meanwhile, various elements and regions in the drawings are schematically shown. Therefore, the spirit of the present disclosure is not limited to relative sizes or spacings shown in the accompanying drawings.

Hereinafter, one or more embodiments is described in more detail with reference to the accompanying drawings.

FIG. 1 is a diagram showing an example of a display device according to one or more embodiments.

A display device 100 according to one or more embodiments may be, for example, a digital signage.

The digital signage may be a digital image device that is installed in a place with a large floating population or where people stay for a certain period of time to thus provide various information and advertisements. The digital signage may be installed on a street, inside a building, on an exterior wall of a building, or the like. In addition, the digital signage may include a video wall that displays an image by using a plurality of display devices as a single screen.

The display device 100 may display an image (hereinafter, HDR image) to which high dynamic range (HDR) technology is applied.

For example, a luminance range that may be expressed by the display may be narrower than a luminance range perceived by human eyes. The HDR technology may be a technology for overcoming this issue by implementing an image in which a difference is maximized between relatively bright and dark portions of the image, thereby expanding a luminance range of the image to be as close as possible to what a person sees with his/her own eyes. A brightness range of the HDR image is wider than that of a standard dynamic range (SDR) image, and the HDR image may express a bright region in the image as brighter and a dark region as darker than the SDR image.

The display device 100 may display the HDR image having a different brightness range based on whether a user 10 is relatively close to a display 120, for example, within a predetermined distance from the display 120.

For example, the display device 100 may display an HDR image having a first brightness range when the user 10 is not relatively close to the display 120, and display an HDR image having a second brightness range when the user 10 is relatively close to the display 120. The brightness range of the HDR image displayed on the display 120 may be changed from the first brightness range to the second brightness range. Here, the maximum value of the second brightness range may be smaller than the maximum value of the first brightness range.

The display device 100 may be installed in a public place (e.g., government office, subway, or bus stop) or a commercial space (e.g., shopping mall or restaurant), and an unexpected problem may thus occur based on its installation location and surrounding environment (a vicinity) when a high-brightness image is suddenly output on the display 120. For example, when the display 120 suddenly outputs strong light, the user 10 who is relatively close to the display 120 may feel pain and glare in the eyes due to a stimulation by strong light momentarily, and may have a negative effect on eyesight.

Accordingly, according to the one or more embodiments, the same HDR image may be displayed while having the different brightness range based on whether the user is relatively close to the display 120, and it is thus possible to more effectively deliver advertisements or information in the public place while reducing a risk of the user who is relatively close to the display 120 being suddenly exposed to bright light.

Figure 2A:
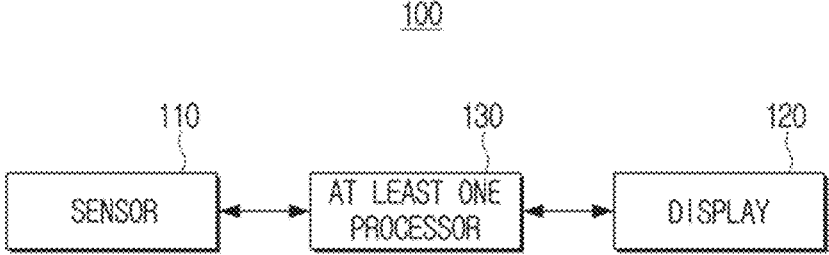
FIG. 2A is a block diagram for explaining a configuration of the display device according to one or more embodiments.

FIG. 2A is a block diagram for explaining a configuration of the display device according to one or more embodiments.

Referring to FIG. 2A, the display device 100 may include a sensor 110, the display 120, and at least one processor 130.

The sensor 110 may detect surroundings of the display 120. For example, the sensor 110 may detect the surroundings of the display 120 at a regular time interval. The surroundings of the display 120 may include a region in front of the display 120. For example, the display 120 may be disposed on a front surface of the display device 100, and the sensor 110 may detect the region in front of the display 120.

The sensor 110 may detect the surroundings of the display 120 and detect that the user is relatively close to the display 120. For example, the sensor 110 may detect the surroundings of the display 120 to thus generate an electrical signal or a data value, indicating the presence or absence of the user or a degree to which the user is relatively close to the display 120 (e.g., a distance between the user and the display 120), and provide the generated electrical signal or data value to at least one processor 130.

For example, the sensor 110 may include at least one of an ultrasonic sensor or a passive infrared (PIR) sensor.

The ultrasonic sensor may output ultrasonic waves to the surroundings of the display 120, measure a difference in time taken for the ultrasonic waves to be reflected from the user and return in case of receiving the ultrasonic waves reflected from the user, and detect the presence or absence of the user in the surroundings of the display 120, the distance between the display 120 and the user, a speed of the user, or the like, by using the measured time difference.

The PIR sensor may detect the user by using infrared light. For example, the PIR sensor may detect a change in infrared radiation emitted from the user within an angular range corresponding to a specific region, and detect the presence or absence of the user in the surroundings of the display 120, the distance between the display 120 and the user, or the like, by using the detected change in the infrared radiation.

In addition, the sensor 110 may include a camera. For example, the camera may be implemented as a red-green-blue (RGB) camera, a depth camera, or the like. The camera may acquire the image by capturing the surroundings of the display 120 and provide the acquired image to at least one processor 130. The camera may include a lens, an image sensor, an image signal processor, or the like. The image captured by the camera may be used to detect the presence or absence of the user in the surroundings of the display 120, the distance between the display 120 and the user, a user gaze direction, etc.

The display 120 may display the image. For example, the display 120 may display a screen including broadcast programs, various information, and advertisements.

The display 120 may be implemented as a light emitting diode (LED) display. The LED display may indicate a display panel that uses the LEDs as pixels. For example, the LED may include not only a general LED but also a micro LED. The micro LED is an ultra-small light emitting diode that emits light by itself, and is an LED having a size of 100 micrometers (µm) or less. The LED display may provide better contrast, response time, and energy efficiency compared to a liquid crystal display (LCD) panel that requires a backlight. In addition, the LED display is relatively free from power constraints and pixel degradation to thus output the high-brightness image of several thousand nits, and may also maintain peak brightness for a long time. In addition, the display 120 may be implemented as a flat display, a curved display having a fixed curvature, or a variable curvature display having a changeable curvature.

At least one processor 130 may control overall operations of the display device 100. For example, at least one processor 130 may be connected to components of the display device 100 to thus control the operations of the display device 100. For example, at least one processor 130 may be connected to the sensor 110 and the display 120 to thus control the operations of the display device 100. At least one processor 130 may be one or more processors.

At least one processor 130 may perform the operation of the display device 100 according to one or more embodiments by executing at least one instruction stored in a memory of the display device 100.

At least one processor 130 may include at least one of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. At least one processor 130 may control one of other components of the display device 100 or any combination thereof, and perform its operation related to communication or data processing. At least one processor 130 may execute at least one program or instruction stored in the memory. For example, at least one processor 130 may perform a method according to one or more embodiments by executing at least one instruction stored in the memory.

A plurality of operations may be performed by one processor or may be performed by a plurality of processors in case that the method according to one or more embodiments includes the plurality of operations. For example, a first operation, a second operation, and a third operation may be performed by the method according to one or more embodiments. In this case, the first operation, the second operation, and the third operation may all be performed by a first processor; or the first operation and the second operation may be performed by the first processor (for example, the generic-purpose processor), and the third operation may be performed by a second processor (for example, an artificial intelligence-only processor).

At least one processor 130 may be implemented as a single core processor including one core, or may be implemented as at least one multicore processor including multicores (e.g., homogeneous multicores or heterogeneous multicores). In case that at least one processor 130 is implemented as the multicore processor, each of the multicores included in the multicore processor may include an internal memory of the processor such as a cache memory or an on-chip memory, and a common cache shared by the multicores may be included in the multicore processor. In addition, each of the multicores included in the multicore processor (or some of the multicores) may independently read and perform a program instruction for implementing the method according to one or more embodiments, or all (or some) of the multicores may be linked to each other to read and perform the program instruction for implementing the method according to one or more embodiments.

In case that the method according to one or more embodiments includes a plurality of operations, the plurality of operations may be performed by one core among the multicores included in the multicore processor, or may be performed by the multicores. For example, in case that the first operation, the second operation, and the third operation are performed by the method according to an embodiment, the first operation, the second operation, and the third operation may all be performed by a first core included in the multicore processor; or the first operation and the second operation may be performed by the first core included in the multicore processor, and the third operation may be performed by a second core included in the multicore processor.

In the one or more embodiments, the processor may include a system-on-chip (SoC) in which at least one processor and other electronic components are integrated to each other, a single core processor, the multicore processor, or the core included in the single core processor or the multicore processor. For example, the core may be implemented as the CPU, the GPU, the APU, the MIC, the DSP, the NPU, the hardware accelerator, or the machine learning accelerator. However, the embodiments of the present disclosure are not limited thereto.

FIG. 2B is a block diagram for explaining a configuration of the display device according to one or more embodiments.

Referring to FIG. 2B, the display device 100 may include the sensor 110, the display 120, at least one processor 130, a memory 140, a communication interface 150, a user interface 160, a speaker 170, an illuminance sensor 180, and a camera 190. However, this configuration is an example, and a new component may be added to or some components may be omitted from this configuration in case that the present disclosure is performed. Meanwhile, the description omits detailed descriptions of a component that overlaps the component shown in FIG. 2A among the components shown in FIG. 2B.

The memory 140 may store data required for the display device 100 to be operated according to the one or more embodiments.

The memory 140 may be implemented as a memory embedded in the display device 100 (e.g., volatile memory, nonvolatile memory, hard drive, or solid state drive) based on a data storage purpose, or may be implemented as a memory that may be detachably attached to the display device 100 (e.g., memory card or external memory).

The memory 140 may store at least one instruction. At least one processor 130 may perform the operation of the display device 100 according to the various embodiments of the present disclosure by executing at least one instruction stored in the memory 140 The memory 140 may store programs, applications, and data for driving the display device 100.

The communication interface 150 may include a circuitry. The communication interface 150 may communicate with an external device. The communication interface 150 may include a wireless communication module or a wired communication module. The communication module may be implemented in the form of at least one hardware chip.

The wireless communication module may be a module communicating with the external device in a wireless manner. For example, the wireless communication module may include at least one of a wireless-fidelity (Wi-Fi) module, a Bluetooth module, or an infrared communication module. However, the wireless communication module is not limited to this example, and may include a communication module that communicates according to various wireless communication standards such as long term evolution (LTE), LTE advanced (LTE-A), 4th generation (4G), and 5th generation (5G).

The wired communication module may be a module communicating with the external device in the wired manner. For example, the wired communication module may include at least one of a local area network (LAN) module or an Ethernet module. In addition, the wired communication module may include at least one wired interface among high definition multimedia interface (HDMI), universal serial bus (USB), USB C-type, and display port (DP).

The user interface 160 may include a circuitry. The user interface 160 may receive user input and transmit the user input to at least one processor 130.

The user interface 160 may include various types of input devices.

For example, the user interface 160 may include a physical button. The physical button may include a function key, a directional key, or a dial button.

For example, the user interface 160 may receive the user input by using a touch method. In one example, the user interface 160 may include a touch screen that performs a display function.

For example, the user interface 160 may receive the user input from the external device. The external device may include a remote control device (e.g., remote control) for controlling the display device 100 or a user mobile device. The mobile device may store an application for controlling the display device 100. The mobile device may receive the user input through the application, and transmit the user input to the display device 100.

For example, the user interface 160 may receive the user input by using, for example, speech recognition. The user interface 160 may receive a user speech by using a microphone. At least one processor 130 may perform a function corresponding to the user speech. For example, at least one processor 130 may convert the user speech into text data by using a speech to text (STT) function, acquire control command data based on the text data, and perform the function corresponding to the user speech based on the control command data. In one or more embodiments, the STT function may be performed on a server.

The speaker 170 may output an audio signal. For example, at least one processor 130 may output audio corresponding to an image displayed on the display device 100, an alert sound related to the operation of the display device 100, a notification message, a response message corresponding to the user input, or the like. In one example, the speaker 170 may include an audio output interface.

The illuminance sensor 180 may detect illuminance in the surroundings of the display device 100. The illuminance sensor 180 may measure an illuminance value in the surroundings of the display device 100 and transmit the electrical signal corresponding to the measured illuminance value to the processor 130. For example, the illuminance sensor 180 may be implemented as any one of a photo sensor, a cadmium sulfide (CDS) sensor, an ultraviolet (UV) sensor, and an ambient light sensor (ALS), and is not limited to this example.

The camera 190 may acquire the image. For example, the camera 190 may be implemented as the RGB camera, the depth camera, or the like. The camera 190 may acquire the image by capturing the surroundings of the display 120. For example, the camera 190 may acquire the image by capturing the region in front of the display 120. In addition, the camera 190 may provide the acquired image to at least one processor 130. FIG. 2B shows the camera 190 as a separate component. However, the camera 190 may be included in the sensor 110. Hereinafter, for convenience of explanation, at least one processor 130 is referred to as the processor 130.

The processor 130 may identify whether the user is relatively close to the display 120 by using the sensor 110.

For example, the processor 130 may identify the user as being relatively close to the display 120 when the user is detected by the sensor 110 as being located within a predetermined distance from the display 120. In addition, the processor 130 may identify the user as not being relatively close to the display 120 when the user is detected by the sensor 110 as not being located within the predetermined distance from the display 120.

In one example, the processor 130 may identify whether the user is relatively close to the display 120 by using the electrical signal or the data value received from the sensor 110. The electrical signal or the data value may include information on the presence or absence of the user detected by the sensor 110 or the degree to which the user is close to the display 120 (e.g., distance between the user and the display 120).

In one example, the processor 130 may analyze the image acquired by the camera to thus identify the presence or absence of the user in the surroundings of the display 120, the distance between the display 120 and the user, or the like.

The processor 130 may display the HDR image on the display 120. The processor 130 may display the HDR image having the first brightness range on the display 120. For example, the processor 130 may display the HDR image having the first brightness range on the display 120 when the user is not relatively close to the display 120.

The processor 130 may display the HDR image having the second brightness range on the display 120 when the user is identified by using the sensor 110 as being close to the display 120 while the HDR image having the first brightness range is displayed.

The maximum value of the second brightness range may be less than the maximum value of the first brightness range.

For example, the maximum value of the first brightness range may be the peak brightness (or peak luminance) of the display 120, and the maximum value of the second brightness range may be the maximum brightness (or maximum luminance) of the display 120.

The maximum brightness may be measured using a full white screen displayed on the display 120.

The peak brightness may be measured using a screen including a test pattern. For example, the peak brightness may be measured using a white window (e.g., 2% window, 10% window, or 25% window) displayed on a partial region of the display 120. The peak brightness may be determined by specifications of the LED included in the display 120, such as light intensity output by the LED or the maximum power of the display device 100. The peak brightness may be higher than the maximum brightness. For example, the maximum brightness of the display 120 may be 600 nit, and the peak brightness of the display 120 may be 1200 nit. As another example, the maximum brightness of the display 120 may be 1000 nit, and the peak brightness of the display 120 may be 2000 nit. However, the peak brightness or maximum brightness of the display 120 is not limited to this example, and may have various values based on specifications of the display 120.

The maximum brightness that may be expressed by the display 120 may be lower than the maximum brightness of the HDR image, or the brightness range that may be expressed by the display 120 may be narrower than the brightness range of the HDR image. Therefore, the processor 130 may perform tone mapping to display the HDR image on the display 120.

The tone mapping may indicate a process of converting a luminance value of an input image into a value within the luminance range that may be expressed by the display to adjust luminance of the input image to luminance suitable for the display. The processor 130 may use the tone mapping to convert the brightness range of the HDR image into the brightness range that may be expressed by the display 120.

For example, the memory 140 may store tone mapping information. The tone mapping information may include a tone curve that maps the brightness range of the HDR image into the brightness range that may be output by the display 120.

In one example, the tone mapping information may include first tone mapping information and second tone mapping information. The first tone mapping information may include information for mapping the brightness range of the HDR image to the first brightness range of the display 120, and the second tone mapping information may include information for mapping the brightness range of the HDR image to the second brightness range of the display 120. The tone mapping information may be acquired from metadata of the HDR image, or generated by the processor 130 based on information acquired from the metadata of the HDR image (e.g., luminance information of the image, color gamut information of a mastering monitor referenced during production of the image, or minimum and maximum brightness of the mastering monitor) and the luminance value that may be expressed by the display 120 (e.g., maximum brightness or peak brightness).

The processor 130 may perform the tone mapping on the HDR image by using the tone mapping information to thus display the HDR image on the display 120.

For example, when the user is identified as not being close to the display 120, the processor 130 may perform the tone mapping on the HDR image by using the first tone mapping information and display the HDR image having the first brightness range on the display 120. The maximum value of the first brightness range may be the peak brightness of the display 120. In addition, when the user is identified as being relatively close to the display 120, the processor 130 may perform the tone mapping on the HDR image by using the second tone mapping information and display the HDR image having the second brightness range on the display 120. The maximum value of the second brightness range may be the maximum brightness of the display 120.

Figure 3A:
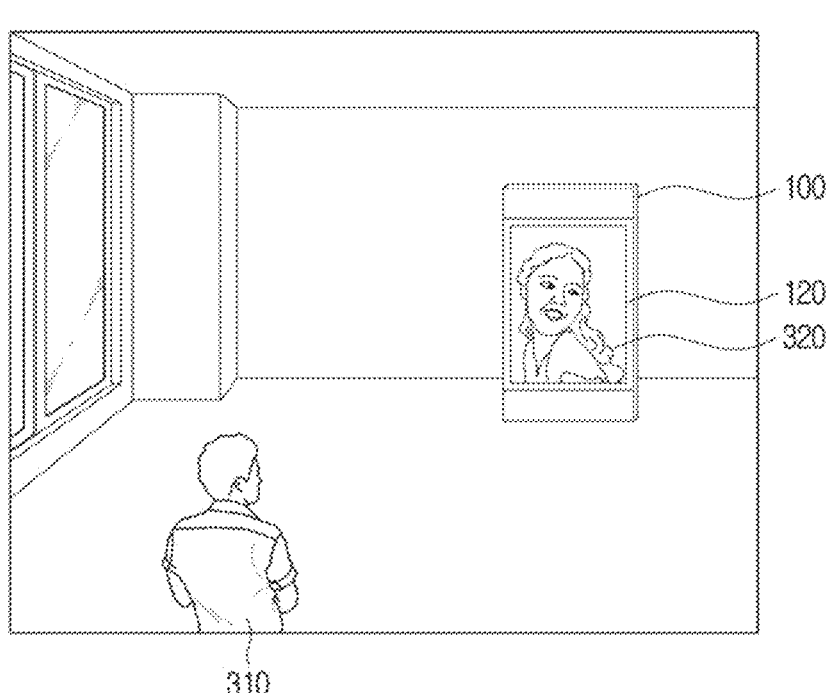
FIGS. 3A, 3B, 4A, 4B, 5A, 5B, 5C, 6A, 6B, 7A, 7B, 7C, 8, 9A, and 9B are diagrams for explaining various examples of the display device displaying a high dynamic range (HDR) image based on whether a user is relatively close to the display according to one or more embodiments.
Figure 3B:
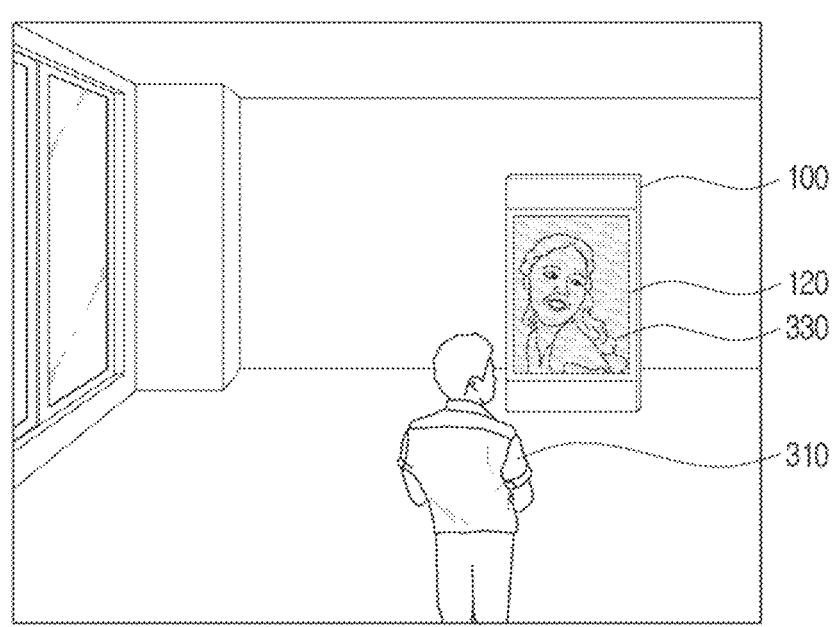

For example, as shown in FIG. 3A, when a user 310 is located at a point at the predetermined distance or more from the display 120, the processor 130 may display an HDR image 320 having the first brightness range on the display 120. In addition, as shown in FIG. 3B, when the user 310 moves and is located within the predetermined distance from the display 120, the processor 130 may display an HDR image 330 having the second brightness range on the display 120.

In this way, according to one or more embodiments, when there is no user relatively close to the display 120, the display device 100 may display the HDR image having high contrast by using the peak brightness higher than the maximum brightness, and when there is a user relatively close to the display 120, the device 100 may limit the luminance of the HDR image by using the maximum brightness to thus reduce the risk of the user being suddenly exposed to bright light.

The processor 130 may display the HDR image having the second brightness range on the display 120 when at least one user among the plurality of users in the surroundings of the display 120 is identified by using the sensor 110 as being relatively close to the display 120 while the HDR image having the first brightness range is displayed.

Figure 4A:
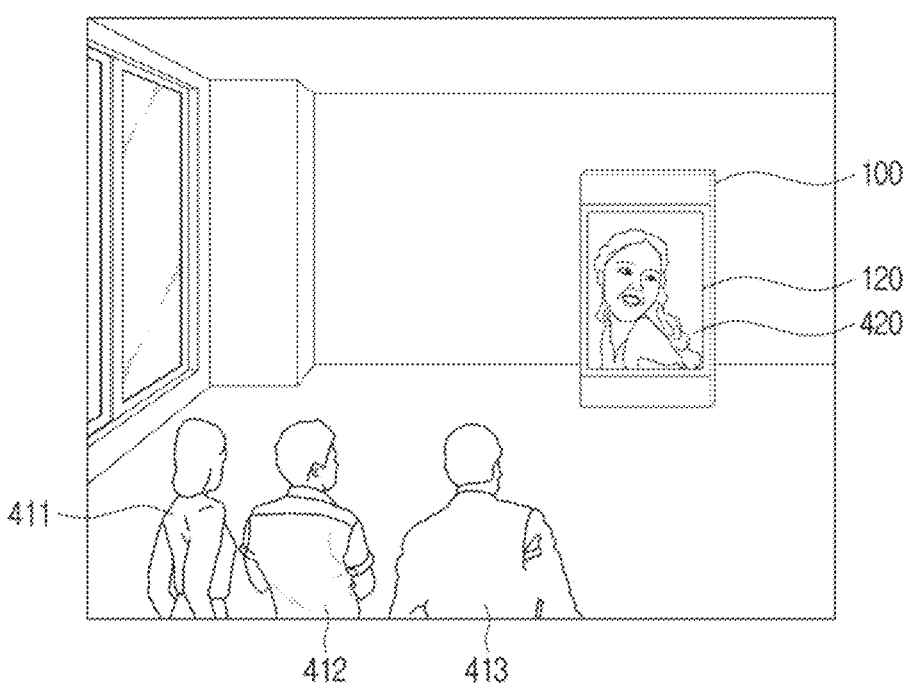

For example, as shown in FIG. 4A, a plurality of users 411, 412, and 413 may exist in the surroundings of the display 120. When all of the plurality of users 411, 412, and 413 are located at a point at the predetermined distance or more from the display 120, the processor 130 may display an HDR image 420 having the first brightness range on the display 120. In addition, as shown in FIG. 4B, when the user 411 among the plurality of users 411, 412, and 413 moves and is located within the predetermined distance from the display 120, the processor 130 may display an HDR image 430 having the second brightness range on the display 120.

Figure 4B:
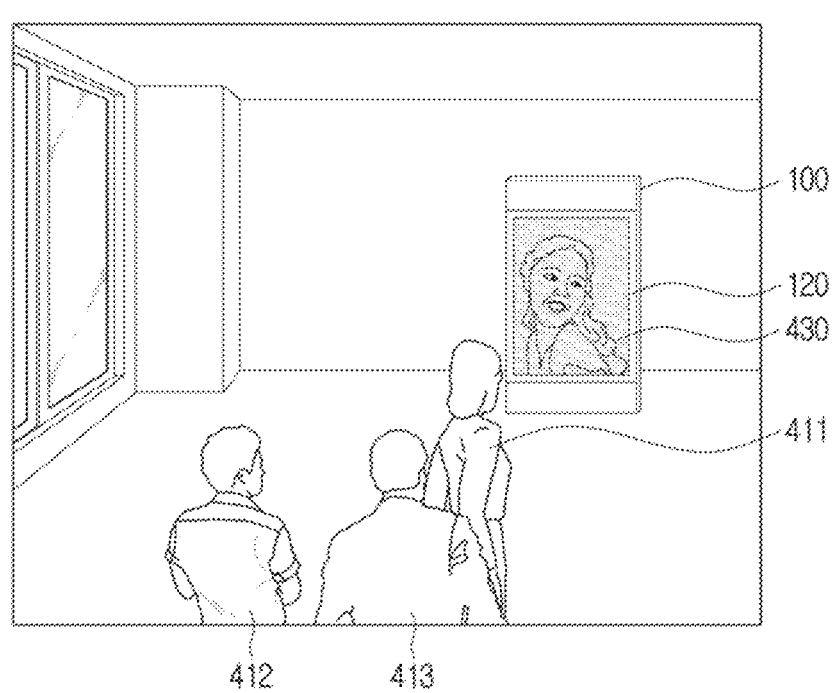

Meanwhile, FIG. 4B shows that one user is located within the predetermined distance from the display 120. However, the present disclosure is not limited to this example. For example, when one user or two or more users among the plurality of users is/are identified as being located within the predetermined distance from the display 120, the processor 130 may display the HDR image having the second brightness range on the display 120.

The processor 130 may identify the brightness range of the HDR image based on a feature of the user relatively close to the display 120.

The feature of the user may include an age of the user. The processor 130 may acquire the image by capturing the region in front of the display 120 by using the camera 190, and identify the age of the user included in the image.

For example, the processor 130 may identify the age of the user by using an artificial intelligence (AI) model. The AI model may be a neural network model trained to identify the age of the user included in the image based on the image. The AI model may output a label value for the age of the user included in an image inferred from the image input to the AI model and a confidence value for the label value. For example, the AI model may include the neural network model including a model parameter trained by applying the plurality of images as input data and applying the label value for the age of the user included in the image as an output correct answer value.

The neural network model according to the present disclosure refers to the AI model including a neural network, and may be trained by deep learning. For example, the neural network may include at least one of a convolutional neural network (CNN), a recurrent neural network (RNN), a restricted Boltzmann machine (RBM), a deep belief network (DBN), a bidirectional recurrent deep neural network (BRDNN), a generative adversarial networks (GAN), and a Deep Q-Network. However, the neural network model is not limited to the above-described examples.

The AI model may be stored in the memory 140. The processor 130 may input the image acquired by the camera 190 into the AI model and acquire information on the age of the user included in the image based on the label value and the confidence value output from the AI model.

As in the example described above, the AI model may be implemented in the form of an on-device included in the display device 100. However, the AI model is not limited thereto, and may be stored on the server connected to the display device 100. When the AI model is stored on the server, the display device 100 may transmit the image to the server through the communication interface 150 and receive information on the age of the user from the server.

The processor 130 may identify the feature of the user as a first feature when the age of the user included in the image is greater than a predetermined value, and identify the feature of the user as a second feature when the age of the user included in the image is predetermined value or less.

In addition, the processor 130 may display the HDR image having the second brightness range on the display 120 when the feature of the user is the first feature, and display an HDR image having a third brightness range on the display 120 when the feature of the user is the second feature.

Here, the maximum value of the third brightness range may be less than the maximum value of the second brightness range. For example, the maximum value of the third brightness range may be half of the peak brightness or half of the maximum brightness. However, the maximum value of the third brightness range is not limited to this example, and may be one of the values less than the maximum brightness.

In one example, the memory 140 may further store third tone mapping information. The third tone mapping information may include information for mapping the brightness range of the HDR image to the third brightness range of the display 120. The processor 130 may perform the tone mapping on the HDR image by using the tone mapping information to thus display the HDR image having the third brightness range on the display 120.

Figure 5A:
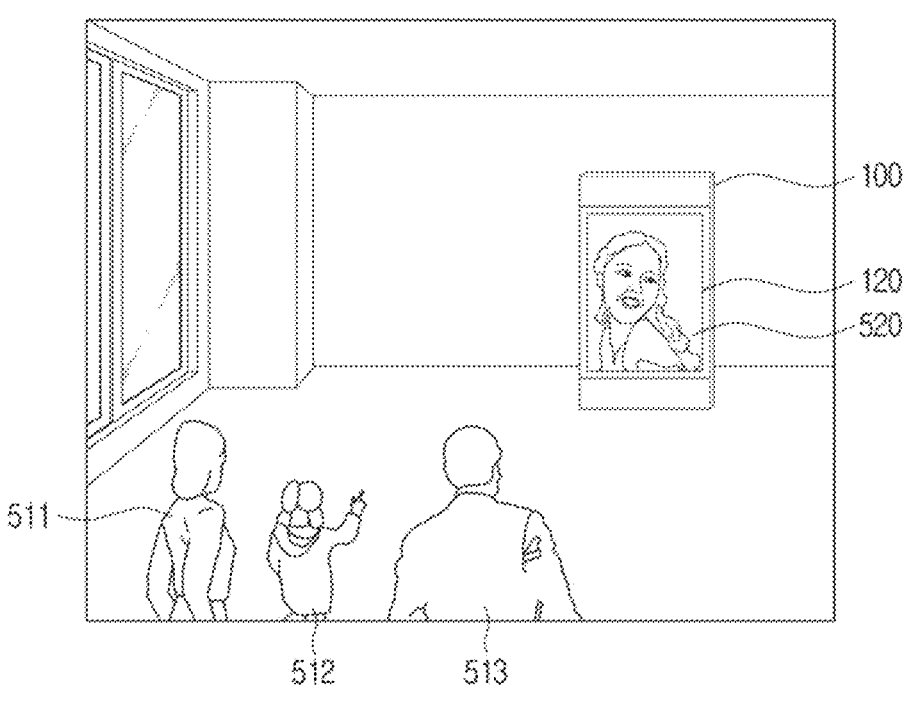
Figure 5B:
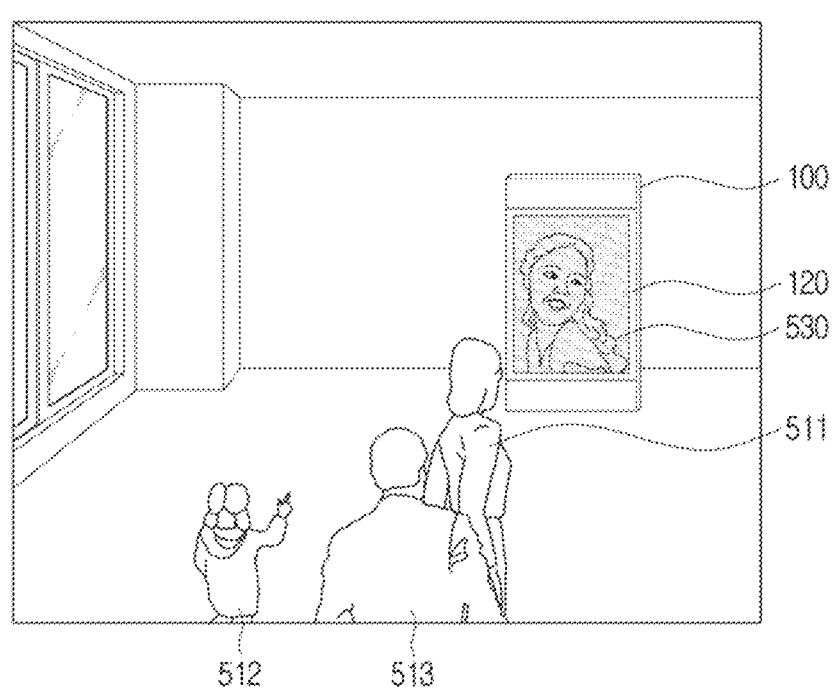
Figure 5C:
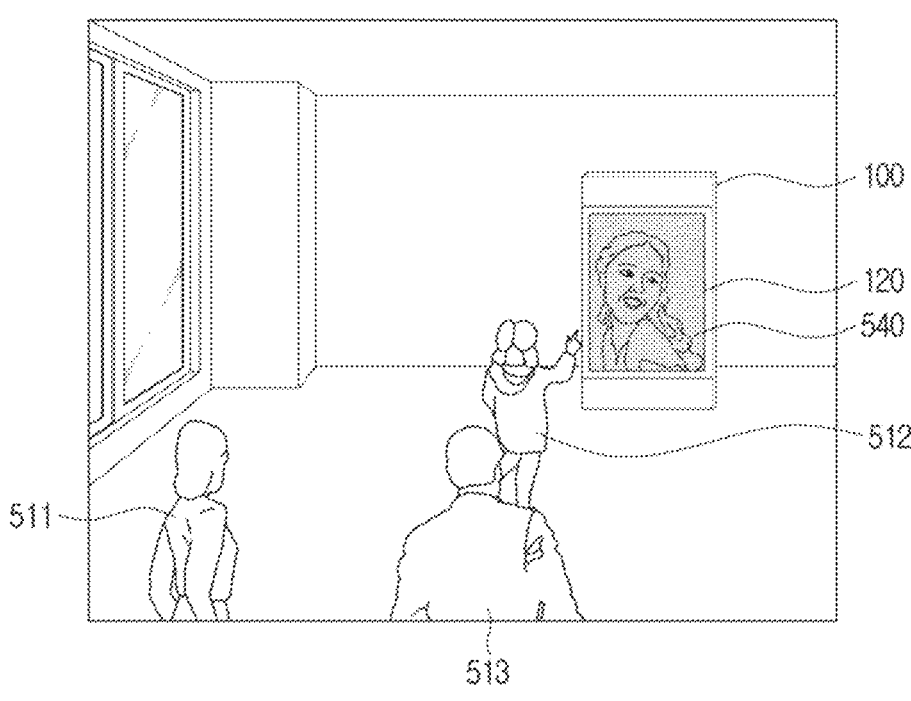

For example, as shown in FIG. 5A, a plurality of users 511, 512, and 513 may exist in the surroundings of the display 120. When all of the plurality of users 511, 512, and 513 are located at a point at a distance greater than or equal to the predetermined distance from the display 120, the processor 130 may display an HDR image 520 having the first brightness range on the display 120. In addition, as shown in FIG. 5B, when the user 511 among the plurality of users 511, 512, and 513 moves and is located within predetermined distance from the display 120, the processor 130 may acquire an image capturing the user 511 by using the camera 190 and identify an age of the user 511 based on the acquired image. When the age of the user 511 is greater than the predetermined value, the processor 130 may display an HDR image 530 having the second brightness range on the display 120. In addition, as shown in FIG. 5C, when the user 512 among the plurality of users 511, 512, and 512 moves and is located within the predetermined distance from the display 120, the processor 130 may acquire an image capturing the user 512 by using the camera 190 and identify an age of the user 512 based on the acquired image. When the age of the user 512 is the predetermined value or less, the processor 130 may display an HDR image 540 having the third brightness range on the display 120.

In this way, the display device 100 may adjust the brightness range of the HDR image displayed on the display 120 by considering the age of the user relatively close to the display 120 because a young child may be relatively more affected by light output from the display 120.

The processor 130 may display the HDR image having the first brightness range on the display 120 when the user is identified by using the sensor 110 as not being relatively close to the display 120 while the HDR image having the second brightness range is displayed.

The users not relatively close to the display 120 may include all the users who are located within the predetermined distance from the display 120 and move to the point at the predetermined distance or more from the display 120, thus resulting in no user being within the predetermined distance from the display 120.

Figure 6A:
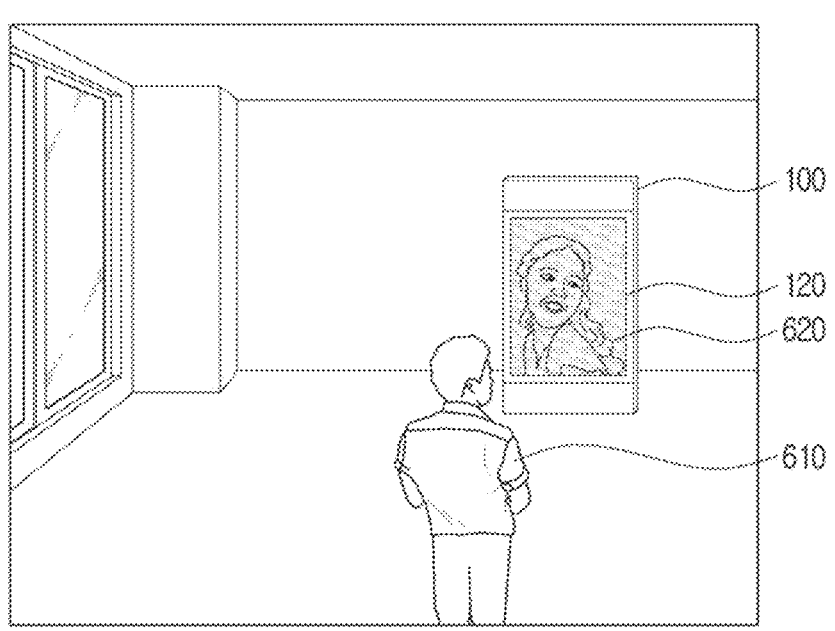
Figure 6B:
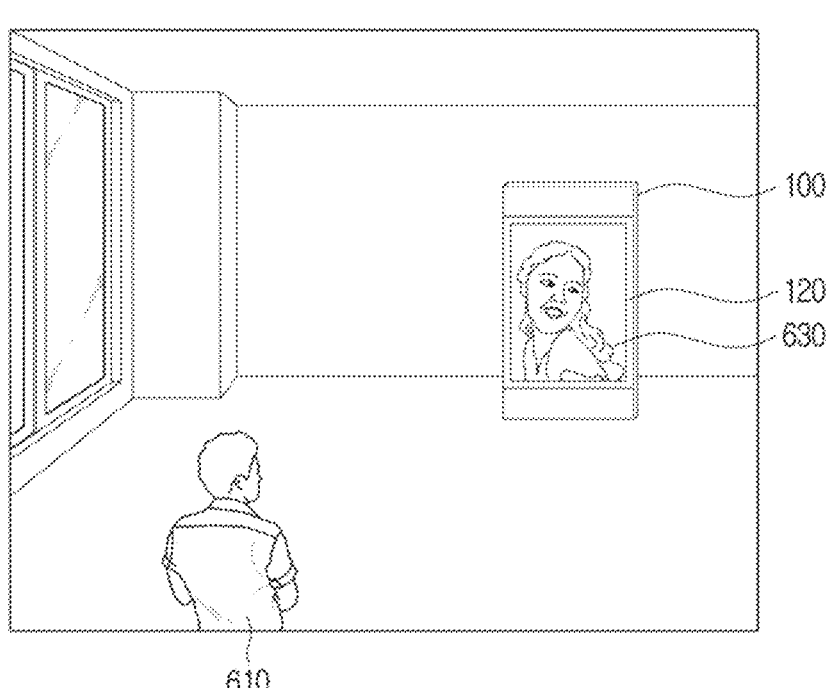

For example, as shown in FIG. 6A, when a user 610 is located within the predetermined distance or more from the display 120, the processor 130 may display an HDR image 620 having the second brightness range on the display 120. In addition, as shown in FIG. 6B, when the user 610 moves to a point at the predetermined distance or more from the display 120, the processor 130 may display an HDR image 530 having the first brightness range on the display 120.

In one example, the processor 130 may display the HDR image having the first brightness range on the display 120 from a time point at which the user is identified as not being relatively close to the display 120.

In one example, the processor 130 may display the HDR image having the second brightness range on the display 120 for a predetermined time from the time point at which the user is identified as not being relatively close to the display 120, and display the HDR image having the first brightness range on the display 120 when a predetermined time point elapses. In addition, the processor 130 may maintain a state where the HDR image having the second brightness range is displayed on the display 120 when the user is identified by using the sensor 110 as being relatively close to the display 120 within the predetermined time.

This operation of the display device 100 may be performed considering that the user who moves to a point at the predetermined distance or more from the display 120 may move back near the display 120.

Figure 7A:
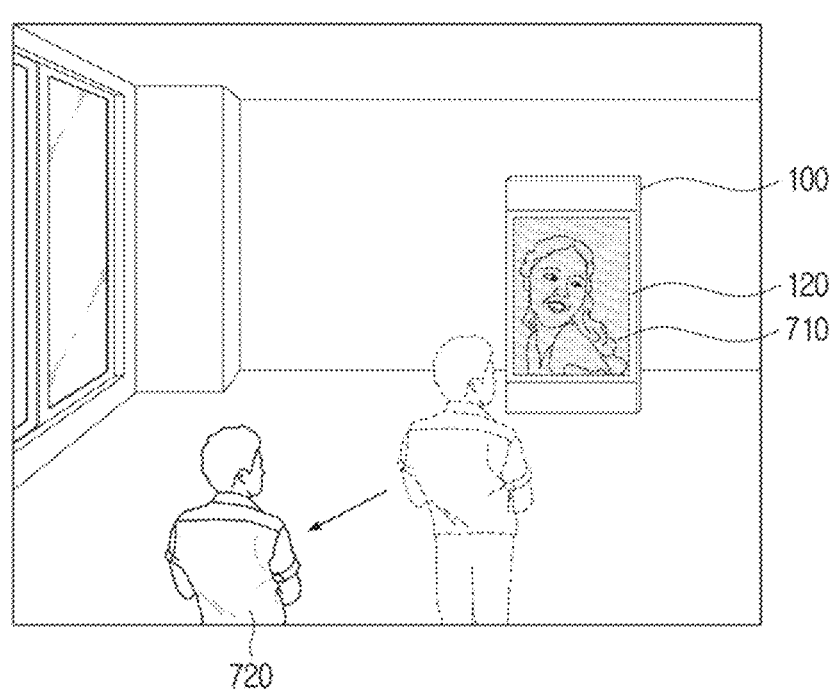
Figure 7B:
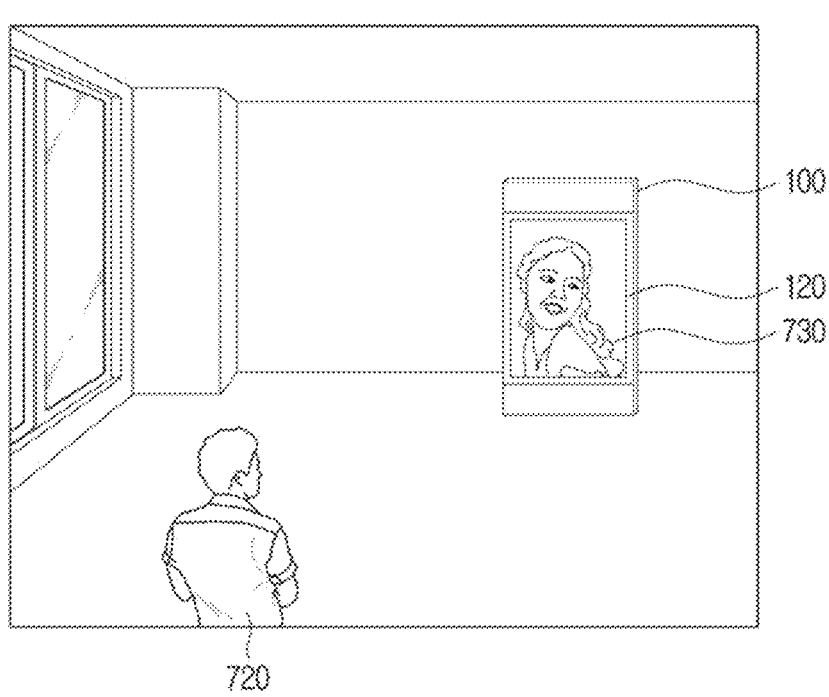

For example, as shown in FIG. 7A, in a state where an HDR image 710 having the second brightness range is displayed on the display 120, a user 720 who is located within the predetermined distance from the display 120 may move to a point at the predetermined distance or more from the display 120. The processor 130 may display the HDR image 710 having the second brightness range on the display 120 for the predetermined time from a time point at which the user 720 is detected to move to a point at the predetermined distance or more from the display 120. In addition, as shown in FIG. 7B, the processor 130 may display an HDR image 730 having the first brightness range on the display 120 when the predetermined time elapses.

Figure 7C:
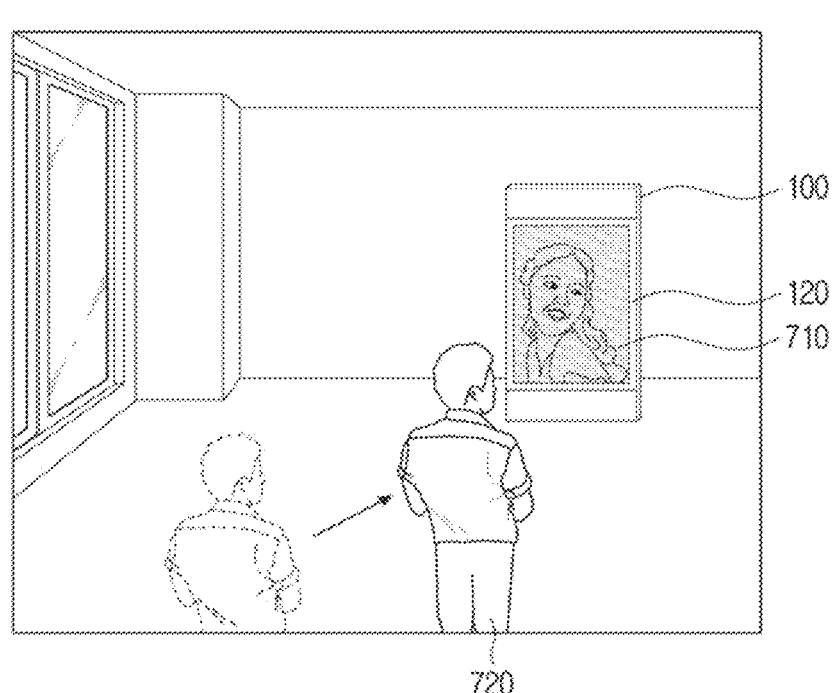

In addition, as shown in FIG. 7C, the user 720 who moves to a point at the predetermined distance or more from the display 120 may move again to within the predetermined distance from the display 120. The processor 130 may maintain the state where the HDR image 710 having the second brightness range is displayed on the display 120 when the user 720 is identified as being detected within the predetermined distance from the display 120 within the predetermined time. For example, the HDR image 710 having the second brightness range displayed on the display 120 may be continuously displayed on the display 120.

The processor 130 may identify the user gaze direction by using the sensor 110.

For example, the processor 130 may identify the user gaze direction by analyzing the image acquired by the camera 190. In one example, the processor 130 may identify user eyes (e.g., pupils) in the image, and detect the direction in which a user gaze is directed by recognizing (or tracking) the gaze based on the position and movement of the eyes. In addition, the processor 130 may identify a user face in the image, and detect the direction in which the user gaze is directed based on a direction of the face.

In addition, the processor 130 may identify a region of the display 120 that corresponds to the user gaze direction. The region corresponding to the gaze direction may include a region of the display 120 to which the user gaze is directed.

For example, the processor 130 may identify coordinates of a point where the user gaze passes on the display 120 based on the user gaze direction, and identify a region of the display 120 that includes the identified coordinates, thereby identifying the region corresponding to the user gaze direction. In one example, when the gaze direction is identified as being directed to the front, the processor 130 may identify the user gaze as being directed to a front region of the display 120 based on the user. In addition, when the gaze direction is identified as being directed to the left, the processor 130 may identify the user gaze as being directed to a left region of the display 120 based on the user. In addition, when the gaze direction is identified as being directed to the right, the processor 130 may identify the user gaze as being directed to a right region of the display 120 based on the user. Meanwhile, the above-described method is an example, and the processor 130 may detect the user gaze direction and identify the region of the display 120 corresponding to the gaze direction by using various methods such as artificial intelligence, machine learning, computer vision technology, and gaze recognition algorithms.

In addition, the processor 130 may display a partial image of the HDR image that is displayed in the region corresponding to the user gaze direction on the display 120 in the second brightness range. That is, the processor 130 may display the HDR image having the second brightness range on the display 120 when the user is relatively close to the display 120. For example, the processor 130 may display the HDR image having the second brightness range only in a region of on the display 120 that the user gazes by considering the user gaze direction, and display the HDR image having the first brightness range on the remaining regions of the display 120.

For example, the processor 130 may perform the tone mapping on the partial image of the HDR image that is displayed in the region corresponding to the user gaze direction on the display 120 by using the second tone mapping information to thus adjust the brightness range of the partial image displayed in the region corresponding to the user gaze direction, and perform the tone mapping on a partial image of the HDR image that is displayed in the remaining region of the display 120 by using the first mapping information to thus adjust the brightness range of the partial image displayed in the remaining region. In addition, the processor 130 may display the HDR image on the display 120.

Figure 8:
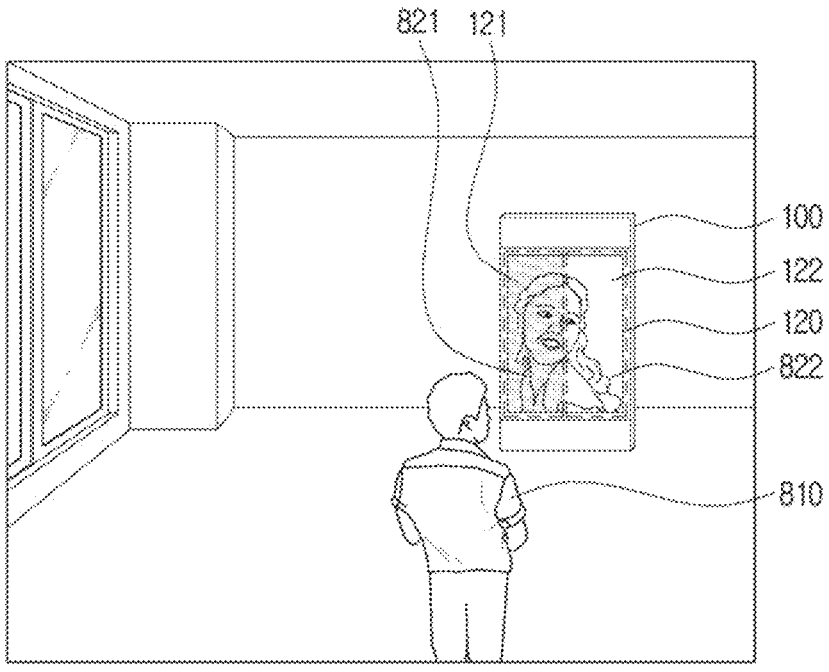

For example, as shown in FIG. 8, assume that a user 810 within the predetermined distance from the display 120 gazes a left region 121 of the display 120. The processor 130 may display a partial image 821 of the HDR image in the second brightness range on the left region 121 of the display 120, and display a partial image 822 of the HDR image in the first brightness range on a remaining region 122.

FIG. 8B shows that one user is located within the predetermined distance from the display 120 as an example. However, embodiments are not limited to this example. The processor 130 may display the HDR image on the display 120 by considering the plurality of user gaze directions within the predetermined distance from the display 120. For example, the processor 130 may identify each gaze direction of the plurality of users relatively close to the display 120 by using the sensor 110, and display each of the partial images of the HDR image that are displayed in the regions of the display 120 that correspond to the plurality of user gaze directions in the second brightness range. For example, the processor 130 may display the partial images of the HDR image in the second brightness range on the plurality of regions of the display 120 that the plurality of users gaze, and display the partial image of the HDR image in the first brightness range on the remaining region.

The above-described example describes that the sensor 110 detects the region in front of the display 120, and is not limited to this example. For example, the region detected by the sensor 110 may include the region in front of the display device 100 and a region behind the display device 100. For example, the display 120 may be disposed in front of the display device 100, and the region in front of the display device 100 may thus include the region in front of the display 120.

The processor 130 may identify the user as being relatively close to the display 120 when the user is detected by the sensor 110 as being located in front of the display device 100 and within the predetermined distance from the display device 100. In addition, the processor 130 may display the HDR image having the second brightness range on the display 120 when the user is identified as being relatively close to the display 120. For example, the processor 130 may display the HDR image having the second brightness range on the display 120 when the user is identified by using the sensor 110 as being relatively close to the display 120 while the HDR image having the first brightness range is displayed on the display 120.

In addition, the processor 130 may identify the user as not being relatively close to the display 120 when the user is detected by the sensor 110 as being located behind the display device 100 and within the predetermined distance from the display device 100. In addition, the processor 130 may display the HDR image having the first brightness range on the display 120 when the user is identified as not being relatively close to the display 120. For example, the processor 130 may continuously display the HDR image having the first brightness range on the display 120 when the HDR image having the first brightness range is displayed on the display 120.

Figure 9A:
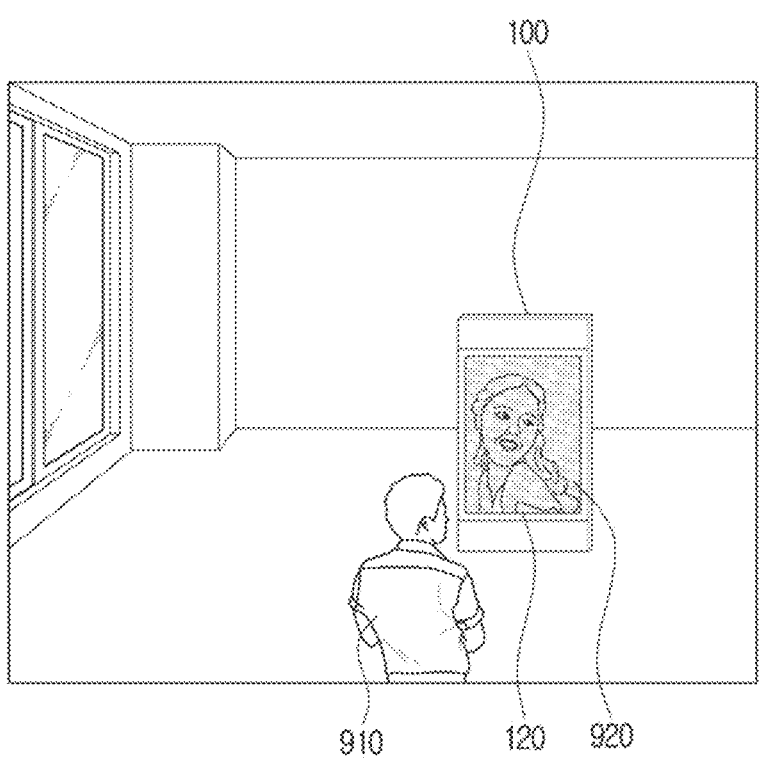
Figure 9B:
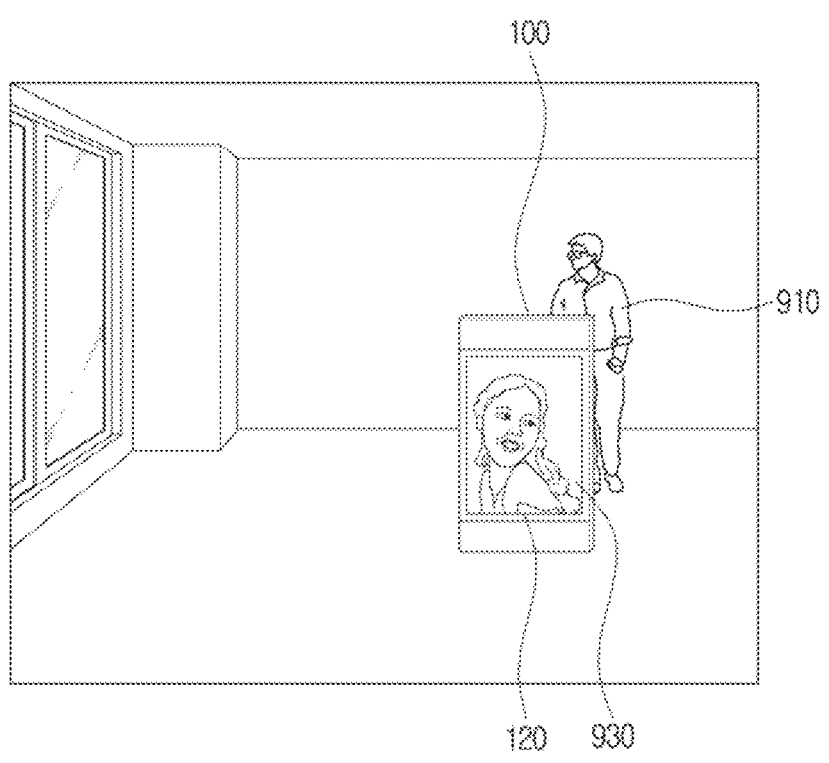

For example, as shown in FIG. 9A, when a user 910 is located in front of the display device 100 and within the predetermined distance from the display device 100, the processor 130 may display an HDR image 920 having the second brightness range on the display 120. In addition, as shown in FIG. 9B, when the user 910 is located behind the display device 100, the display 120 may not be disposed within a visible range of the user 910. Therefore, the HDR image having the relatively high brightness may not affect the user even in case of being displayed on the display 120. when the user 910 is located behind the display device 100 and within the predetermined distance from the display device 100, the processor 130 may display an HDR image 930 having the first brightness range on the display 120.

Figure 10A:
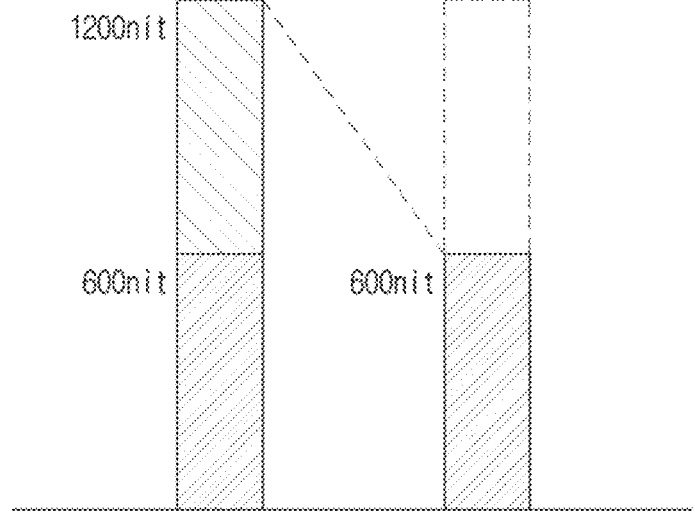
FIGS. 10A and 10B are diagrams showing an example of a brightness range of the display based on whether the user is relatively close to the display according to one or more embodiments.
Figure 10B:
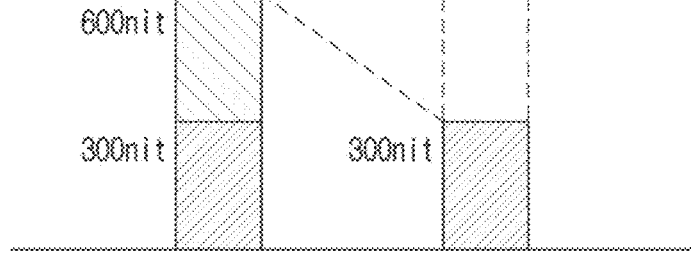

FIG. 10A and FIG. 10B are diagrams showing an example of the brightness range of the display based on whether the user is relatively close to the display according to one or more embodiments.

In FIGS. 10A and 10B, it is assumed that the peak brightness of the display 120 is 1200 nit and the maximum brightness of the display 120 is 600 nit.

Referring to FIGS. 10A and 10B, the processor 130 may limit the brightness of the display 120 based on the illuminance value in the surroundings of the display device 100. For example, the processor 130 may display the HDR image on the display 120 by using the peak brightness and the maximum brightness based on the illuminance value detected by the illuminance sensor 180, or display the HDR image on the display 120 by using brightness that is half of the peak brightness and half of the maximum brightness.

In one example, the processor 130 may display the HDR image on the display 120 by using the peak brightness and the maximum brightness when the illuminance value detected by the illuminance sensor 180 is greater than or equal to the predetermined value. As shown in FIG. 10A, the processor 130 may display the HDR image having a brightness range of 0 to 1200 nit on the display 120 by using the peak brightness when the user is identified as not being relatively close to the display 120. In addition, the processor 120 may display the HDR image having a brightness range of 0 to 600 nits on the display 120 by using the maximum brightness when the user is identified as being relatively close to the display 120.

The processor 130 may display the HDR image on the display 120 by using the brightness value that is half of the peak brightness and half of the maximum brightness when the illuminance value detected by the illuminance sensor 180 is less than the predetermined value. As shown in FIG. 10B, the processor 130 may display the HDR image having the brightness range of 0 to 600 nit on the display 120 by using the brightness value that is half of the peak brightness when the user is identified as not being relatively close to the display 120. In addition, the processor 120 may display the HDR image having a brightness range of 0 to 300 nits on the display 120 by using the luminance value that is half of the maximum brightness when the user is identified as being relatively close to the display 120.

Figure 11:
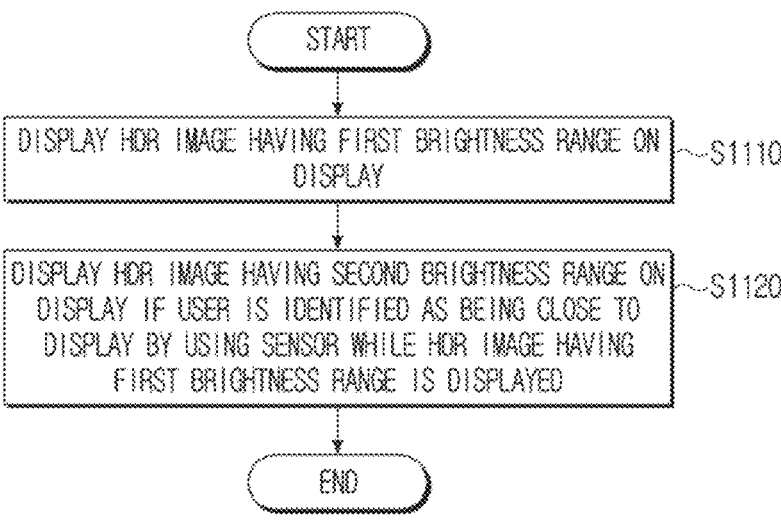
FIG. 11 is a flow chart for explaining an image display method of a display device according to one or more embodiments.

FIG. 11 is a flow chart for explaining an image display method of a display device according to one or more embodiments.

The method may include displaying a high dynamic range (HDR) image having a first brightness range on a display (S1110).

The method may include displaying an HDR image having a second brightness range on the display when a user is identified as being relatively close to the display by using a sensor while the HDR image having the first brightness range is displayed.

The maximum value of the second brightness range may be less than the maximum value of the first brightness range.

For example, the maximum value of the first brightness range may be peak brightness (or peak luminance) of the display, and the maximum value of the second brightness range may be the maximum brightness (or maximum luminance) of the display.

In addition, the image display method according to the present disclosure may include identifying the user as being relatively close to the display when the user is detected by the sensor as being located within a predetermined distance from the display.

In addition, the image display method according to the present disclosure may include displaying the HDR image having the first brightness range on the display 120 when the user is identified by using the sensor as not being relatively close to the display while the HDR image having the second brightness range is displayed.

In addition, when the user is identified as not being relatively close to the display, in the displaying of the HDR image having the first brightness range on the display, the HDR image having the second brightness range may be displayed on the display for a predetermined time from a time point at which the user is identified as not being relatively close to the display, and the HDR image having the first brightness range may be displayed on the display when the predetermined time elapses.

In addition, in the displaying of the HDR image having the second brightness range on the display, the HDR image having the second brightness range may be displayed on the display when at least one user among the plurality of users in surroundings of the display is identified by using the sensor as being relatively close to the display while the HDR image having the first brightness range is displayed.

In addition, in the displaying of the HDR image having the second brightness range on the display, a user gaze direction may be identified using the sensor, and a partial image of the HDR image that is displayed in a region corresponding to the gaze direction may be displayed on the display in the second brightness range.

The various embodiments described above may be implemented in a recording medium readable by a computer or similar device using software, hardware, or a combination of software and hardware. In some cases, the embodiments described in the specification may be implemented by the processor itself. According to a software implementation, the embodiments such as the procedures and functions described in the specification may be implemented by separate software modules. Each of the software modules may perform at least one function or operation described in the specification.

Meanwhile, computer instructions for executing processing operations of an electronic device according to the various embodiments of the present disclosure described above may be stored in a non-transitory computer-readable medium. The computer instructions stored in the non-transitory computer-readable medium may cause a specific device to perform the processing operations of the display device 100 according to the various embodiments described above in case of being executed by a processor of the specific device.

The non-transitory computer-readable medium is not a medium that temporarily stores data, such as a register, a cache, or a memory, and may be a medium that semipermanently stores data and is readable by a machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although the embodiments are shown and described in the present disclosure as above, the present disclosure is not limited to the above-mentioned specific embodiments, and may be variously modified by those skilled in the art to which the present disclosure pertains without departing from the gist of the present disclosure as claimed in the accompanying claims and their equivalents. These modifications should also be understood to fall within the scope and spirit of the present disclosure.

What is claimed is:

1. A display device comprising:

a sensor;

a display; and at least one processor configured to:

display a high dynamic range (HDR) image having a first brightness range on the display; and display an HDR image having a second brightness range on the display based on a user being identified by the sensor as being within a predetermined distance from the display while the HDR image having the first brightness range is displayed, wherein a maximum value of the second brightness range is less than a maximum value of the first brightness range, wherein the maximum value of the first brightness range is peak brightness of the display, wherein the maximum value of the second brightness range is maximum brightness of the display.

2. The device as claimed in claim 1, wherein the at least one processor is further configured to identify the user being within the predetermined distance from the display based on the user being detected by the sensor as being within the predetermined distance from the display.

3. The device as claimed in claim 2, wherein the at least one processor is further configured to:

identify the user as being within the predetermined distance from the display based on the user being detected by the sensor as being in front of the display and within the predetermined distance from the display device; and identify the user as not being within the predetermined distance from the display based on the user being detected by the sensor as being behind the display device and within the predetermined distance from the display device.

4. The device as claimed in claim 1, wherein the at least one processor is further configured to display the HDR image having the first brightness range on the display based on the user being identified by the sensor as not being within the predetermined distance from the display while the HDR image having the second brightness range is displayed.

5. The device as claimed in claim 3, wherein the at least one processor is further configured to:

display the HDR image having the second brightness range on the display for a predetermined time from a time point at which the user is identified as not being within the predetermined distance from the display; and display the HDR image having the first brightness range on the display based on the predetermined time elapsing.

6. The device as claimed in claim 5, wherein the at least one processor is further configured to maintain the HDR image having the second brightness range being displayed on the display based on the user being identified by the sensor as being within the predetermined distance from the display within the predetermined time.

7. The device as claimed in claim 1, wherein the at least one processor is further configured to display the HDR image having the second brightness range on the display based on at least one user among the plurality of users in a vicinity of the display being identified by the sensor as being within the predetermined distance from the display while the HDR image having the first brightness range is displayed.

8. The device as claimed in claim 5, wherein the at least one processor is further configured to:

identify a feature of the user within the predetermined distance from the display;

display the HDR image having the second brightness range on the display based on the feature of the user being a first feature; and display an HDR image having a third brightness range on the display based on the feature of the user being a second feature, wherein the feature of the user is determined based on an age of the user, and wherein a maximum value of the third brightness range is less than the maximum value of the second brightness range.

9. The device as claimed in claim 1, wherein the at least one processor is further configured to:

identify a user gaze direction by the sensor; and display a partial image of the HDR image that is displayed in a region corresponding to the gaze direction on the display in the second brightness range.

10. An image display method of a display device including a sensor, the method comprising:

displaying a high dynamic range (HDR) image having a first brightness range on a display; and displaying an HDR image having a second brightness range on the display based on a user being identified by the sensor as being within a predetermined distance from the display while the HDR image having the first brightness range is displayed, wherein a maximum value of the second brightness range is less than a maximum value of the first brightness range, wherein the maximum value of the first brightness range is peak brightness of the display, and wherein the maximum value of the second brightness range is maximum brightness of the display.

11. The method as claimed in claim 10, further comprising identifying the user as being within the predetermined distance from the display based on the user being detected by the sensor as being within a predetermined distance from the display.

12. The method as claimed in claim 11, further comprising:

identifying the user as being within the predetermined distance from the display based on the user being detected by the sensor as being in front of the display and within the predetermined distance from the display device; and identifying the user as not being within the predetermined distance from the display based on the user being detected by the sensor as being behind the display device and within the predetermined distance from the display device.

13. The method as claimed in claim 10, further comprising displaying the HDR image having the first brightness range on the display based on the user being identified by the sensor as not being within the predetermined distance from the display while the HDR image having the second brightness range is displayed.

14. The method as claimed in claim 12, further comprising:

displaying the HDR image having the second brightness range on the display for a predetermined time from a time point at which the user is identified as not being within the predetermined distance from the display; and displaying the HDR image having the first brightness range on the display based on the predetermined time elapsing.

15. The method as claimed in claim 14, further comprising:

maintaining the HDR image having the second brightness range being displayed on the display based on the user being identified by the sensor as being within the predetermined distance from the display within the predetermined time.

16. The method as claimed in claim 10, further comprising:

displaying the HDR image having the second brightness range on the display based on at least one user among the plurality of users in a vicinity of the display being identified by the sensor as being within the predetermined distance from the display while the HDR image having the first brightness range is displayed.

17. The method as claimed in claim 14, further comprising:

identifying a feature of the user within the predetermined distance from the display;

displaying the HDR image having the second brightness range on the display based on the feature of the user being a first feature; and displaying an HDR image having a third brightness range on the display based on the feature of the user being a second feature, wherein the feature of the user is determined based on an age of the user, and wherein a maximum value of the third brightness range is less than the maximum value of the second brightness range.

18. The method as claimed in claim 10, further comprising:

identifying a user gaze direction by the sensor; and displaying a partial image of the HDR image that is displayed in a region corresponding to the gaze direction on the display in the second brightness range.

* * * * *